United States Patent [19]

Charen

[11] Patent Number: 4,993,772
[45] Date of Patent: Feb. 19, 1991

[54] SPRING-LOADED, DUAL-ACTION HINGE ASSEMBLY FOR VEHICLE ACCESSORIES

[75] Inventor: Grace M. Charen, Oxford, Mich.

[73] Assignee: Irvin Automotive Products, Inc., Auburn Hills, Mich.

[21] Appl. No.: 482,271

[22] Filed: Feb. 20, 1990

[51] Int. Cl.$^5$ .............................................. B60J 3/00
[52] U.S. Cl. ..................................... 296/97.1; 16/341; 16/342
[58] Field of Search ................... 296/97.1, 97.2, 97.5; 362/74, 142, 144; 16/321, 342, 341

[56] References Cited

U.S. PATENT DOCUMENTS

| | | |
|---|---|---|
| 325,006 | 8/1885 | Neeley . |
| 876,039 | 1/1908 | Burrell . |
| 1,026,706 | 5/1912 | Sears . |
| 1,530,162 | 3/1925 | Foreman . |
| 1,573,272 | 2/1926 | Phillips . |
| 1,576,793 | 3/1926 | Sadler . |
| 1,893,458 | 1/1933 | Tatum . |
| 1,894,233 | 1/1933 | Ellis . |
| 1,905,868 | 4/1933 | Hein . |
| 2,118,198 | 5/1938 | Hathaway . |
| 2,123,319 | 7/1938 | Thompson . |
| 2,148,557 | 2/1939 | Hook . |
| 2,231,641 | 2/1941 | Schwab . |
| 2,268,189 | 12/1941 | Colbert . |
| 2,466,454 | 4/1949 | Logan . |
| 2,506,689 | 5/1950 | Simpson et al. . |
| 2,547,101 | 4/1951 | Uttz . |
| 2,640,909 | 6/1953 | Montgomery . |
| 2,818,298 | 12/1957 | Goeske . |
| 2,844,200 | 7/1958 | Herr et al. . |
| 3,159,421 | 12/1964 | Samuelson . |
| 3,193,323 | 7/1965 | Herr et al. . |
| 3,211,903 | 10/1965 | McElreath . |
| 3,305,679 | 2/1967 | Barcita-Peruchena . |
| 3,375,364 | 3/1968 | Marcus . |
| 3,429,610 | 2/1969 | Bornefeld . |
| 3,449,011 | 6/1969 | Edwards et al. . |
| 3,542,416 | 11/1970 | Nelson . |
| 3,550,187 | 12/1970 | Swartz . |
| 3,576,409 | 4/1971 | Fiddler . |
| 3,605,175 | 9/1971 | Wilson . |
| 3,610,680 | 10/1971 | Brady . |
| 3,641,334 | 2/1972 | Kipping . |
| 3,751,106 | 8/1973 | Mahler et al. . |
| 3,794,828 | 2/1974 | Arpino . |
| 3,795,422 | 3/1974 | Robinson et al. . |
| 3,842,463 | 10/1974 | Wehner . |
| 3,853,370 | 12/1974 | Barnhart . |
| 3,871,703 | 3/1975 | Accatino . |
| 3,926,470 | 12/1975 | Marcus . |
| 4,000,404 | 12/1976 | Marcus . |
| 4,070,054 | 1/1978 | Cziptschirsch . |
| 4,075,468 | 2/1978 | Marcus . |
| 4,174,864 | 11/1979 | Viertel et al. . |

(List continued on next page.)

FOREIGN PATENT DOCUMENTS

| | | |
|---|---|---|
| 0061622 | 3/1982 | European Pat. Off. . |
| 1032112 | 6/1958 | Fed. Rep. of Germany . |
| 2027386 | 12/1971 | Fed. Rep. of Germany . |
| 0053663 | 1/1981 | Fed. Rep. of Germany . |
| 3118267 | 6/1982 | Fed. Rep. of Germany . |
| 1143365 | 9/1957 | France . |
| 443964 | 2/1968 | Switzerland . |

*Primary Examiner*—Margaret A. Focarino
*Assistant Examiner*—Joseph D. Pape
*Attorney, Agent, or Firm*—Harness, Dickey & Pierce

[57] ABSTRACT

A spring-loaded hinge assembly is adapted for use in pivotally interconnected components, such as hinged or pivotal components in accessory assemblies in vehicle applications. The hinge assembly provides for at least a pair of predetermined relative rotational orientations, or detented positions, of the pivotally interconnected components. Each of these detented positions is independently controlled by separate and distinct spring-and-cam arrangements, such that the rotational efforts, and consequently the detent holding forces, can be different from one another, if desired in a given application. The hinge assembly is especially advantageous in covered vanity assemblies on automotive sunvisors, for example.

42 Claims, 7 Drawing Sheets

U.S. PATENT DOCUMENTS

| | | | |
|---|---|---|---|
| 4,178,035 | 12/1979 | Cziptschirsch . | |
| 4,203,149 | 5/1980 | Viertel et al. . | |
| 4,205,873 | 6/1980 | Viertel et al. . | |
| 4,213,169 | 7/1980 | Kempkers . | |
| 4,272,118 | 6/1981 | Viertel et al. . | |
| 4,280,730 | 7/1981 | Turner . | |
| 4,352,519 | 10/1982 | Aro . | |
| 4,363,511 | 12/1982 | Viertel et al. . | |
| 4,363,512 | 12/1982 | Marcus . | |
| 4,364,598 | 12/1982 | Viertel . | |
| 4,378,129 | 3/1983 | Kaiser et al. . | |
| 4,417,761 | 11/1983 | Cziptschirsch et al. . | |
| 4,421,355 | 12/1983 | Marcus . | |
| 4,428,612 | 1/1984 | Viertel et al. . | |
| 4,451,076 | 5/1984 | Viertel et al. . | |
| 4,469,367 | 9/1984 | Kuttler et al. . | |
| 4,479,172 | 10/1984 | Connor . | |
| 4,512,605 | 4/1985 | Aschermann et al. . | |
| 4,541,663 | 9/1985 | Schwanitz et al. . | |
| 4,564,234 | 1/1986 | Kaiser et al. . | |
| 4,582,356 | 4/1986 | Kaiser et al. . | |
| 4,591,956 | 5/1986 | Majchrzak . | |
| 4,600,234 | 7/1986 | Jönsås | 296/97.1 |
| 4,715,644 | 12/1987 | Lobanoff et al. . | |
| 4,760,503 | 7/1988 | VandenBerge et al. . | |
| 4,785,500 | 11/1988 | Langridge | 16/341 X |
| 4,796,944 | 1/1989 | Lobanoff et al. . | |
| 4,850,081 | 7/1989 | Grant | 16/341 X |
| 817159 | 7/1959 | United Kingdom . | |
| 854938 | 11/1960 | United Kingdom . | |
| 999331 | 7/1965 | United Kingdom . | |
| 1043087 | 9/1966 | United Kingdom . | |
| 1214327 | 12/1970 | United Kingdom . | |

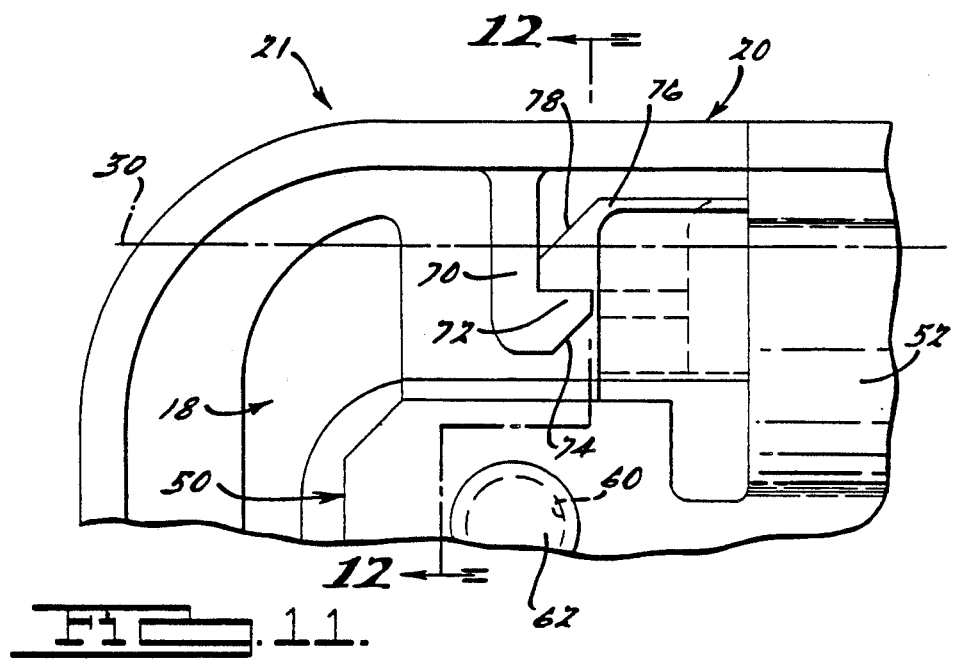
FIG. 11.
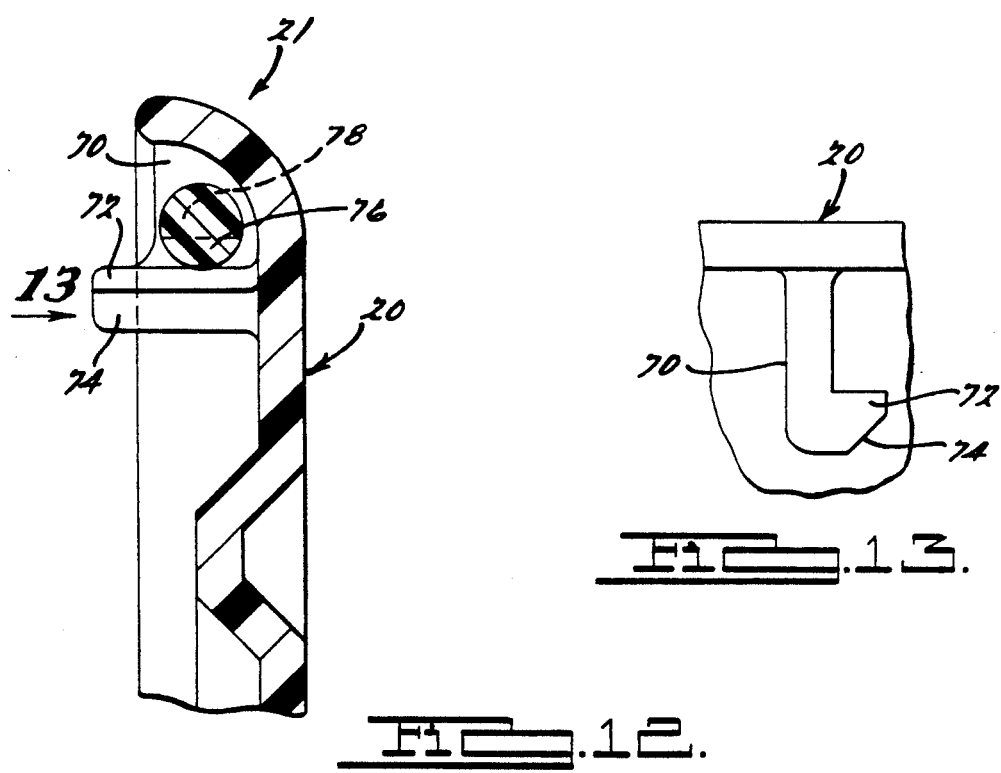
FIG. 12.
FIG. 13.

SPRING-LOADED, DUAL-ACTION HINGE ASSEMBLY FOR VEHICLE ACCESSORIES

BACKGROUND AND SUMMARY OF THE INVENTION

The present invention relates generally to hinge assemblies for hinged or pivotally interconnected members, with the present invention being most particularly well-suited for such hinge assemblies adapted for pivotally interconnecting a vehicle accessory door with a vehicle accessory housing structure or other interior, or even exterior, portions of the vehicle. Vehicle accessory doors for the accessory assemblies mentioned above typically include vanity doors, storage compartment doors, audio equipment cover doors, or other such accessory covers, especially for accessory assemblies that are adapted to be attached to a vehicle interior member, such as an interior panel, a sunvisor, or other vehicle structures. Hinge assemblies according to the present invention can also be employed for various exterior uses, or even non-vehicular uses, as will be readily appreciated by one skilled in the art from the following discussion.

Typically, vehicles include a wide variety of hinged or pivotally mounted vehicle accessories or accessory covers in the interior, luggage storage areas, engine compartment, or other areas. In the past, however, several of such hinge assemblies for such vehicular applications, as well as those for various non-vehicular applications, have lacked sufficient durability, have been relatively expensive to produce and install, or have suffered other functional or aesthetic disabilities. Furthermore, many of such prior hinge assemblies have been found to be unacceptably bulky, unsightly, or ill-fitting, and all of such effects detract from the user's perception of quality with regard to the vehicle or other device in which such hinge assemblies are included.

In addition, many prior hinge assemblies have not provided the user with relatively rotated or pivoted detent positions, in which the hinged members can be releasably held and maintained, especially after extended use and wear of the components of the hinge assembly. Some examples of the prior art, wherein such a feature has been provided, however, include over-center, spring-and-lever arrangements, such as those shown in U.S. Pat. Nos. 4,491,899; 4,227,242; and 4,000,404. Another example of the prior art includes an arrangement having a coil spring with its opposite ends interconnected with opposite hinged members in order to bias the two hinge members toward one another. This hinge arrangement does not have a pivot pin or other member pivotally interconnecting the hinged members, and thus the spring functions both as a resilient biasing member for resiliently biasing the hinged members toward one another, as well as acting as a "fastener" for securing the hinged members together. Such arrangements have been found to be disadvantageous in terms of durability, performance, complexity, or expense of manufacture. The need has therefore arisen for a hinge assembly of the general type described herein, which is simple and inexpensive to produce, assemble, and install, that is highly durable, and that is capable of maintaining the hinged members in one or more relatively rotated or pivoted detent orientations, such as in open and closed positions, for example.

An example of a prior art spring-loaded hinge assembly that addresses this need is illustrated and described in U.S. Pat. Nos. 4,715,644 and 4,796,944, both of which are owned by the same assignee as that of the present invention, and both of which are hereby incorporated by reference. Although the hinge assemblies illustrated and described in these two United States patents have performed well and have been successful in addressing the disadvantages and problems discussed above, the present invention seeks to provide an even further improvement over these hinge assemblies.

According to the present invention, a spring-loaded, dual-action hinge assembly is provided for interconnecting first and second relatively rotatable or pivotal members in a hinged relationship with respect to one another, with the hinge assembly according to the present invention being particularly well-suited for interconnecting a vehicle accessory door with a vehicle accessory housing structure, wherein the accessory housing structure is adapted for attachment to a vehicle interior member. Such a hinge assembly includes a pivot arrangement for pivotally interconnecting the first and second members for relative rotational movement about a generally longitudinally-extending axis. A first cam member protrudes in a generally lateral direction from one of either the first or second members, with the first cam member having at least one dwell portion thereon. A corresponding first resilient biasing arrangement on the other of either the first or second members is resiliently deflectably engageable by the first cam member for exerting a first resilient biasing force on the first cam member. Such first resilient biasing arrangement tends to releasably maintain the first and second members in a first predetermined relative rotational orientation when engaged by the first dwell portion of the first cam member.

Similarly, a second cam member is provided and protrudes in a generally lateral direction from said one of the first or second members, with the second cam member having a second dwell portion thereon. A corresponding second resilient biasing arrangement is provided on the other of the first or second members, with the second resilient biasing arrangement being resiliently deflectably engageable by the second cam member for exerting a second resilient biasing force on the second cam member. Such second resilient biasing arrangement tends to releasably maintain the first and second members in a second predetermined relative rotational orientation when engaged by the second dwell portion of the second cam member.

Preferably, the above-mentioned first and second cam members are separate and distinct from one another, and similarly the above-mentioned first and second resilient biasing arrangements are separate and distinct from one another, but are preferably interconnected with a common base that is secured to the above-mentioned other of either the first or second members. The above-mentioned first and second cam members can be generally solid, one-piece cam portions, or each of the first and second cam members be formed in a split or parallel, multiple cam configuration such as that shown for purposes of illustration in the accompanying drawings and discussed in more detail below. Such split or parallel cam configuration can facilitate the forming of the cam members, especially in instances where the first and second pivotally interconnected members are injection molded. In such an instance, the split, parallel configuration of each of the first and second cam members can greatly reduce the material sinking or sagging in the areas of the injection-molded parts adjacent the cam members.

In any of the variations of the present invention, however, the provision of at least two separate and distinct cam members or split cam member groups, with their respective corresponding separate and distinct resilient biasing members, allows a dual-acting function to be obtained. Such dual-acting function allows the opportunity for providing different efforts for moving the first and second members out of either of their detented positions, which can be especially advantageous where one of the detented positions is a so-called "open" position and a relatively heavy door or cover must be releasably maintained in such open position.

These and other features of the present invention are described below and illustrated in the accompanying drawings. Additional objects, advantages, and features of the present invention will become apparent from the following description and appended claims, taken in conjunction with the accompanying drawings.

BRIEF DESCRIPTION OF THE DRAWINGS

FIG. 11 is a partial rear view of the exemplary vanity assembly of FIGS. 1 through 10, but illustrating an optional arrangement for retaining the vanity door and the vanity housing structure in their pivotally interconnected condition during relative rotational movement.

FIG. 12 is a cross-sectional view taken generally along line 12—12 of FIG. 11.

FIG. 13 is a partial detailed view taken generally along line 13 of FIG. 12.

DETAILED DESCRIPTION OF THE PREFERRED EMBODIMENTS

FIGS. 1 through 20 illustrate preferred, exemplary embodiments of spring-loaded, dual-acting hinge assemblies according to the present invention, which are shown incorporated in an exemplary application for a vanity door of a vanity assembly on one side of a vehicle sunvisor. One skilled in the art will readily recognize from the discussion, claims, and drawings herein, however, that the principles of the present invention are equally applicable to hinge assemblies and accessory assemblies other than those shown in FIGS. 1 through 20, as well as in other vehicular or non-vehicular applications, including arrangements where the hinge assembly is incorporated into a device adapted for attachment to a wide variety of interior or exterior members.

Figure 1:
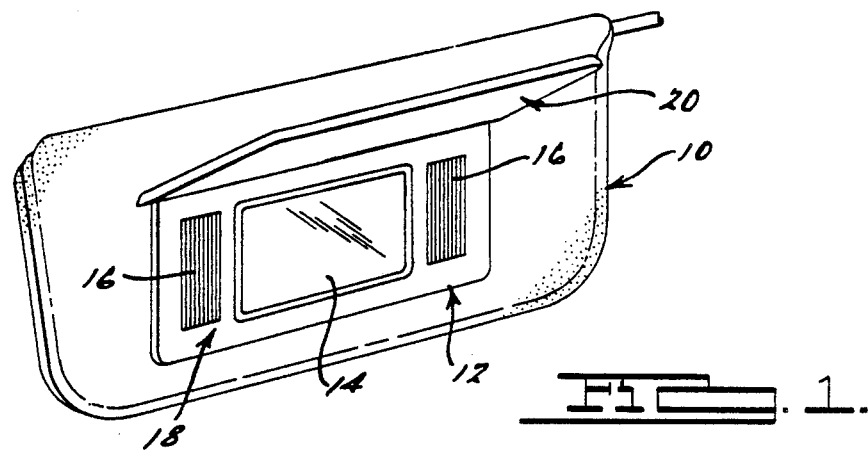
FIG. 1 is a perspective view of an exemplary sunvisor assembly for the interior of a vehicle, with the exemplary visor having an illustrative vanity assembly with a hinge assembly according to the present invention for pivotally interconnecting the vanity door with the vanity housing structure.
Figure 2:
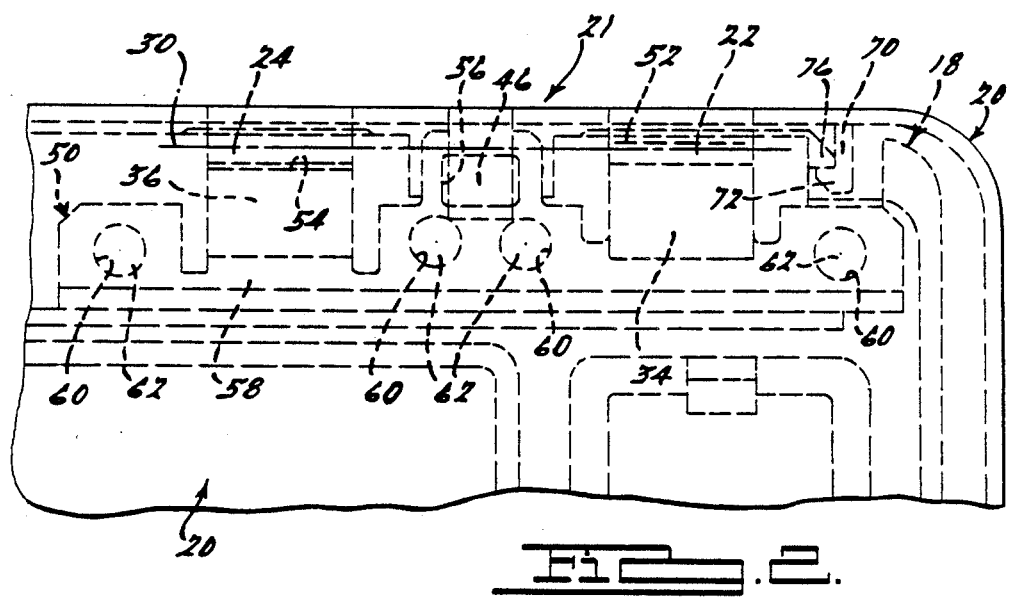
FIG. 2 is a partial front view of the exemplary vanity assembly of FIG. 1, shown in a closed position, with the hinge assembly illustrated in hidden lines.
Figure 3:
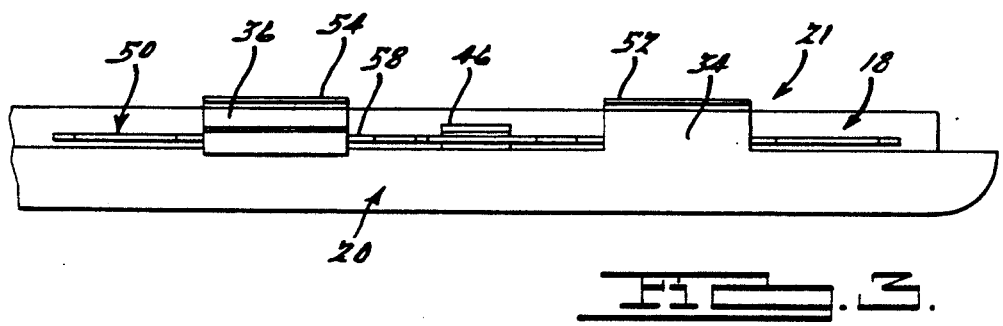
FIG. 3 is a diagrammatic, partial top view of the assembly of FIG. 2, with various components removed for purposes of clarity.
Figure 4:
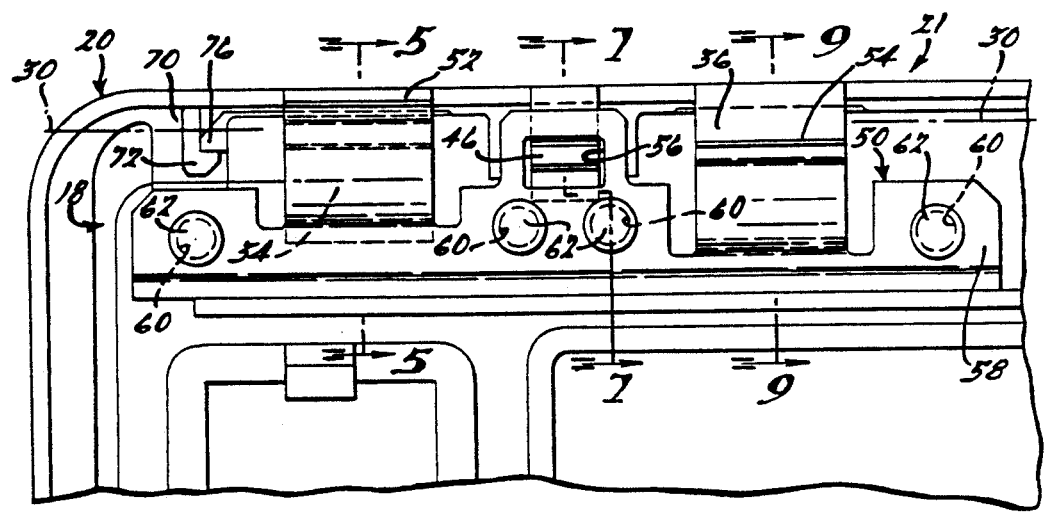
FIG. 4 is another partial view of the exemplary vanity assembly of FIG. 1, as seen from the rear of the assembly.

FIG. 1 illustrates an exemplary sunvisor 10, adapted for pivotal interconnection with a headliner or roof portion of the interior of a vehicle (not shown). A vanity assembly 12, or other vehicle accessory, is mounted on one side of the sunvisor 10, or other vehicle interior member, and can optionally include a mirror 14, one or more lights 16, and a housing structure 18, which is pivotally interconnected with a vanity door 20 for relative rotational movement therebetween.

FIGS. 2 through 20 illustrate various detailed views of the vanity assembly 12, and an exemplary hinge assembly 21 (or alternative versions thereof), as well as various components thereof. The exemplary hinge assembly 21 includes one or more, and preferably four, pivot pins 22 and 24, which are received (preferably in a snapped-in relationship) within corresponding respective bearing openings 26 and 28 for relative pivotal or rotational movement between the door 20 and the housing structure 18 about a generally longitudinally-extending centerline axis 30. Preferably surrounding the pivot pins 22 and 24, and the bearing openings 26 and 28, are at least a pair of configurations including respective cam members 34 and 36, which have dwell portions 38 and 40, respectively, formed thereon. In addition, at least one protrusion 46, extends laterally from the door 20, the function of which is explained in more detail below.

One or more spring members 50 are provided, with each spring member 50 corresponding to a pair of cam arrangements 34 and 36, with each spring member 50 preferably including a leaf spring portion 52 adapted for resilient deflectable engagement by the cam members 34, and similarly a leaf spring portion 54, which is adapted for resilient deflectable engagement with the cam members 36. A central tab 55 is preferably provided on the spring member 50 and includes a receptacle or opening 56 extending therethrough, which is adapted for receiving the above-mentioned protrusion 46 therein, at least during a portion of the relative rotational movement of the door 20 and the housing structure 18. Such an arrangement, with the protrusion 46 extending through the opening 56, as is perhaps best illustrated in FIGS. 7 and 8, substantially prevents the vanity door and vanity housing structure from being disconnected from one another while the protrusions 46 extend through the opening 56 during at least the initial opening movement, or the terminal closing movement, of the door 20 relative to the housing structure 18.

Although the leaf spring portions 52 and 54 are separate and distinct from one another, for resilient deflectable engagement with their respective separate and distinct cam members 34 and 36, the leaf spring portions 52 and 54 are preferably interconnected with a common base portion 58, which is equipped with mounting holes 60 that allow for the base portion 58 to be attached to the housing structure by way of heat stakes 62, or other fastening methods or arrangements well-known to those skilled in the art. Such common base 58, although fixed, is also preferably resiliently deflectable and thus can contribute to the resilient biasing forces exerted by the leaf spring portions 52 and 54 on the respective cam members 34 and 36, which together provide for at least a pair of different predetermined detented, or predetermined relative rotational orientations, of the door 20 and the housing structure 18 with respect to one another due to the leaf spring portions 52 and 54 engaging the respective dwell portions 38 and 40 of the cam members 34 and 36, respectively.

In addition, the preferred door 20 also includes an optional tab member 70 secured to the door 20 for relative rotational movement with respect to the housing structure 18. The tab member 70, which is perhaps best illustrated in FIGS. 11 through 13, includes a generally hooked portion 72 protruding in a generally longitudinal direction from the remainder of the tab member 70. Correspondingly, the housing structure 18 preferably includes a generally longitudinally-extending pin member 76 secured for relative rotational movement therewith, with the pin member 76 preferably being positioned with its centerline coincident with the centerline pivotal axis 30 mentioned above. The pin member 76 is adapted for relative sliding engagement with the hooked portion 72 of the tab member 70 as the door 20 and the housing structure 18 are moved through at least a portion, and preferably substantially all, of their relative rotational movement. The tab member 70, with its hooked portion 72, acts in conjunction with the pin members 76 to substantially prevent disconnection of the door 20 and the housing structure 18 from one another during relative rotational movement beyond the range of movement in which the above-mentioned protrusion 46 is received within the opening 56 in the spring member 50. Together these two arrangements provide for a secure, pivotal interconnection of the door 20 and the housing structure 18, and substantially prevent damage or breakage resulting from partial disconnection prior to, or during, the opening of the door 20.

Preferably, in order to facilitate the ease of assembly of the hinge assembly 21, especially in applications wherein the various components are formed of plastic or other synthetic materials, such as by injection molding, for example, the hooked portion 72 includes a chamfered edge 74, as shown in FIGS. 11 through 13, and correspondingly, the pin member 76 also includes a chamfered portion 78 thereon. This arrangement allows for the pin member 76 and the hooked portion 72 to be "snapped" into engagement with one another during assembly of the door 20 and the housing structure 18 into pivotal interconnection with one another, during which the pivot pins 22 and 24 are also preferably snapped into the respective bearing openings 26 and 28. In this regard, it is preferred that the vanity assembly 12 can be assembled by first assembling the door 20 onto the housing structure 18, with the pivot pins 22 and 24 snapped into their respective bearing openings 26 and 28, and with the pin member 76 and the hooked portion 72 snapped together, as mentioned above. The spring members 50 can then be mounted in their positions as shown in the drawings.

Figures 5, 6:
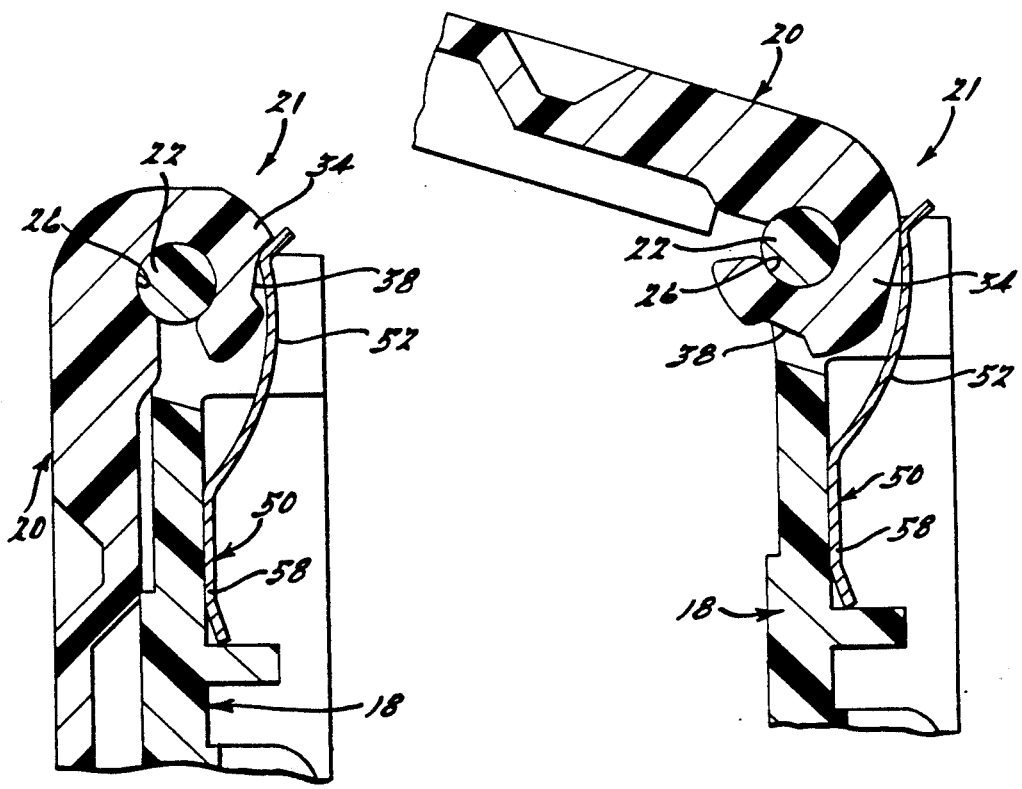
FIG. 5 is a cross-sectional view taken generally along line 5—5 of FIG. 4.
FIG. 6 is a cross-sectional view similar to that of FIG. 5, but illustrating the vanity door in an open position.
Figure 7:
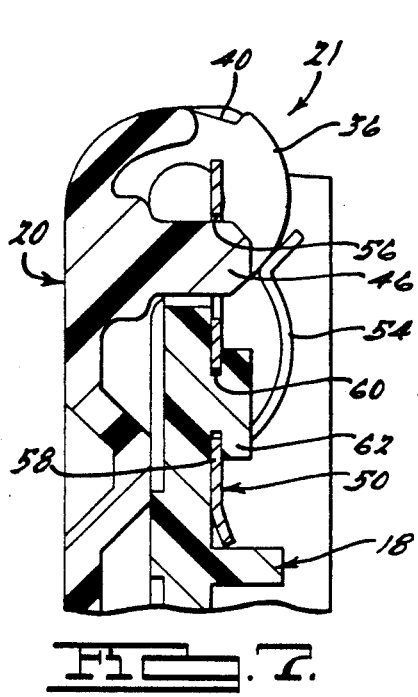
FIG. 7 is a cross-sectional view taken generally along line 7—7 of FIG. 4.

Once the door 20 is assembled in a pivotal, hinged relationship with the housing structure 18 and the spring members 50 are properly mounted, the hinge assembly 21, which is only an exemplary or illustrative hinge assembly according to the present invention, functions as follows. When the door 20 is rotated to a first predetermined relative rotational orientation with respect to the housing structure 18, such as the closed door orientation partially illustrated in FIGS. 4, 5, 7, and 9, the cam members 34 are positioned in an orientation wherein the leaf spring portions 52 of the spring members 50 are resiliently and deflectably engaged by the dwell portions 38, as illustrated in FIG. 5. Thus, in this condition, the door 20 is releasably maintained in its detented, closed-door position due to the resilient biasing force exerted upon the cam members 34 by the leaf spring portions 52. Also as a result of this biasing force, the door 20 is resiliently urged, and substantially "self-propelled", into the closed door detented position shown in FIG. 5 whenever the door 20 is moved to a relative rotational orientation in close proximity with the closed-door relative rotational orientation at which the dwell portions 38 of the cam members 34 engage the leaf spring portions 52. Correspondingly, because the dwell portions 38 are not aligned circumferentially with the dwell portions 40 on the cam members 36, the leaf spring portions 54 do not engage the dwell portions 40 of the cam members 36 when the door 20 and the housing structure 18 are in the closed-door orientation shown in FIG. 9.

Figure 8:
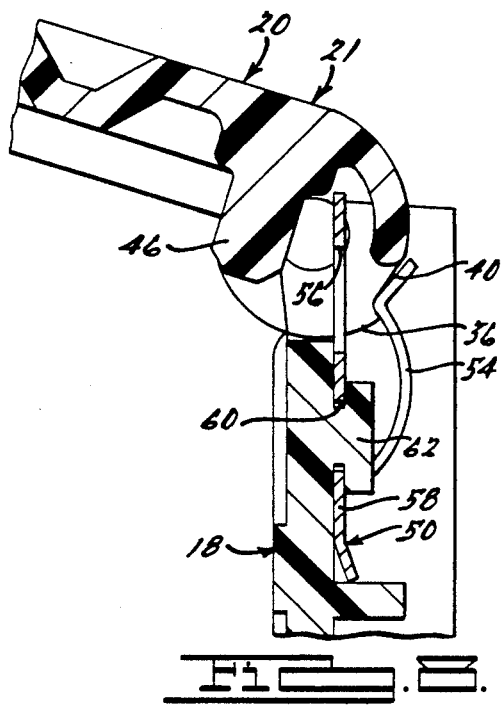
FIG. 8 is a cross-sectional view similar to that of FIG. 7, but illustrating the vanity door in an open position.
Figure 9:
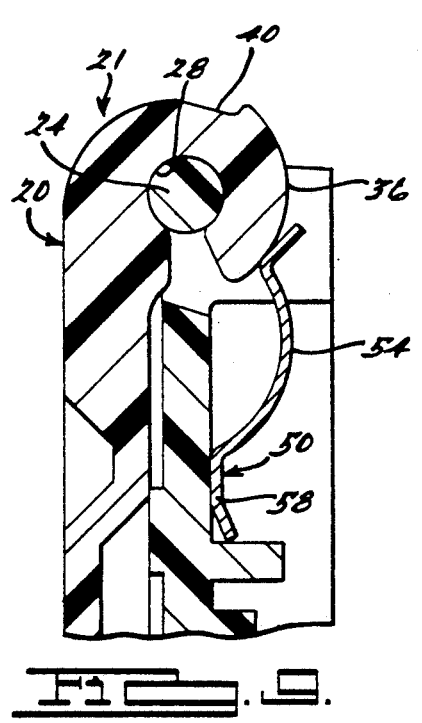
FIG. 9 is a cross-sectional view taken generally along line 9—9 of FIG. 4.
Figure 10:
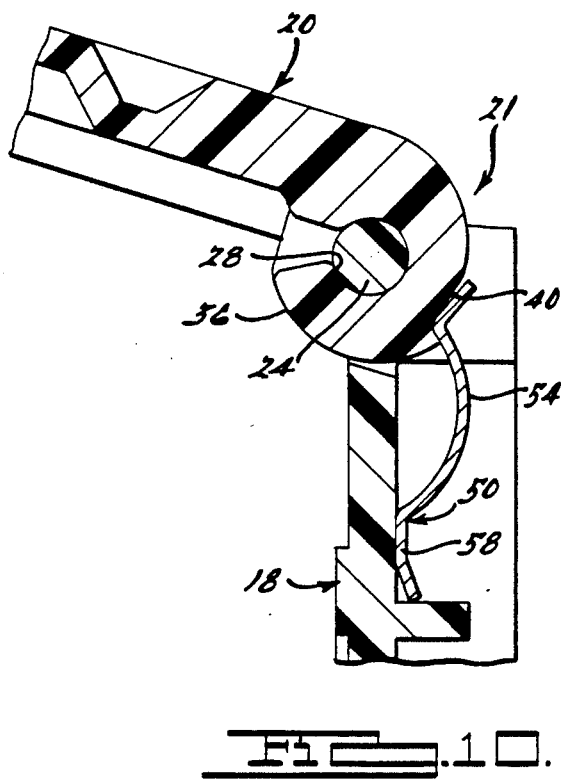
FIG. 10 is a cross-sectional view similar to that of FIG. 9, but illustrating the vanity door in an open position.

Conversely, when the door 20 is rotated to its detented, predetermined relative rotational orientation with the door in its fully-opened position, as illustrated in FIGS. 6, 8, and 10, the dwell portions 40 on the cam members 36 are resiliently and deflectably engaged by the leaf spring portions 54 of the spring members 50, with this engagement serving to releasably maintain the door 20 in its open-door detented position. In a manner similar to that discussed above, the door 20 is also resiliently urged, and substantially self-propelled, into the open-door, predetermined rotational orientation whenever the door 20 and the housing structure 18 are moved to relative rotational orientations in close proximity with the open-door position at which the dwell portions 40 of the cam members 36 are engaged by the leaf spring portions 54 of the spring members 50.

Although only two detented positions, or predetermined relative rotational orientations of the door 20 with respect to the housing structure 18 are shown in the drawings and discussed herein, one skilled in the art will now readily recognize that any number of predetermined relative rotational orientations can be provided in accordance with the present invention. In this regard, however, it should be noted that it is preferred that at least one separate and distinct cam member arrangement, with its corresponding separate and distinct leaf spring member, be provided for each predetermined relative rotational orientation, rather than forming more than one dwell portion on a single cam member. Such an arrangement is especially advantageous in applications, such as vanities for sunvisors, because it allows the cam members to be smaller than would otherwise be necessary if multiple dwell portions were provided on each cam member, thus providing for a more compact physical configuration, as well as a more smoothly operating hinge assembly. In certain applications, however, it is contemplated that there may not be sufficient space for such an arrangement, in which case more than one dwell portion may be necessary on a single cam member or cam arrangement.

Furthermore, in this regard, although the exemplary vanity assembly 12 depicted merely for purposes of illustration in the drawings includes two pivot pins 22 and two pivot pins 24, each being received within their respective separate and distinct bearing openings 26 and 28 in the cam member arrangements 34 and 36, respectively, a greater or lesser number of pivot pin and cam member arrangements can alternatively be provided. One advantage, however, of the exemplary arrangement depicted in the drawings is that there is less stress on each of the four pivot pins resulting from the resilient biasing forces of the spring members 50 than would be present if a lesser number of pivot pins were used. Similarly, although the exemplary vanity assembly 12 depicted in the drawings includes a cam member 34 and a cam member 36 at each end of the vanity assembly 12, with each engaging its corresponding leaf spring portion 52 or 54, respectively, with one spring member 50 at each end of the vanity assembly 12, a greater or lesser number of such cam member leaf-spring portion arrangements can alternatively be provided. The arrangement of the exemplary vanity assembly 12 depicted in the drawings, however, was found to be advantageous since the resilient biasing forces exerted by the leaf spring portions 52 and the leaf spring portions 54 on the spring members 50 are balanced at each end of the vanity assembly 12, in both the open and closed door positions.

Finally, it should be noted that the provision of separate resilient biasing springs, such as the leaf spring portions 52 and 54, has been found to be very advantageous in that it provides for the dual-acting nature of the hinge assembly 21. The leaf spring portions 52, being separate and distinct from the leaf spring portions 54, can be formed to have a different length, or a different curvature, or otherwise have a different resilient deflection when engaged by their corresponding cam members, in order to vary the rotational efforts in the various predetermined relative rotational orientations. This arrangement is particularly advantageous when a door, such as the vanity door 20, is equipped with accessories, or is otherwise relatively heavy, so that the resilient biasing force that maintains the door 20 in its open position can be increased without unnecessarily affecting the resilient biasing force necessary to releasably maintain the door in its closed position.

Figure 14:
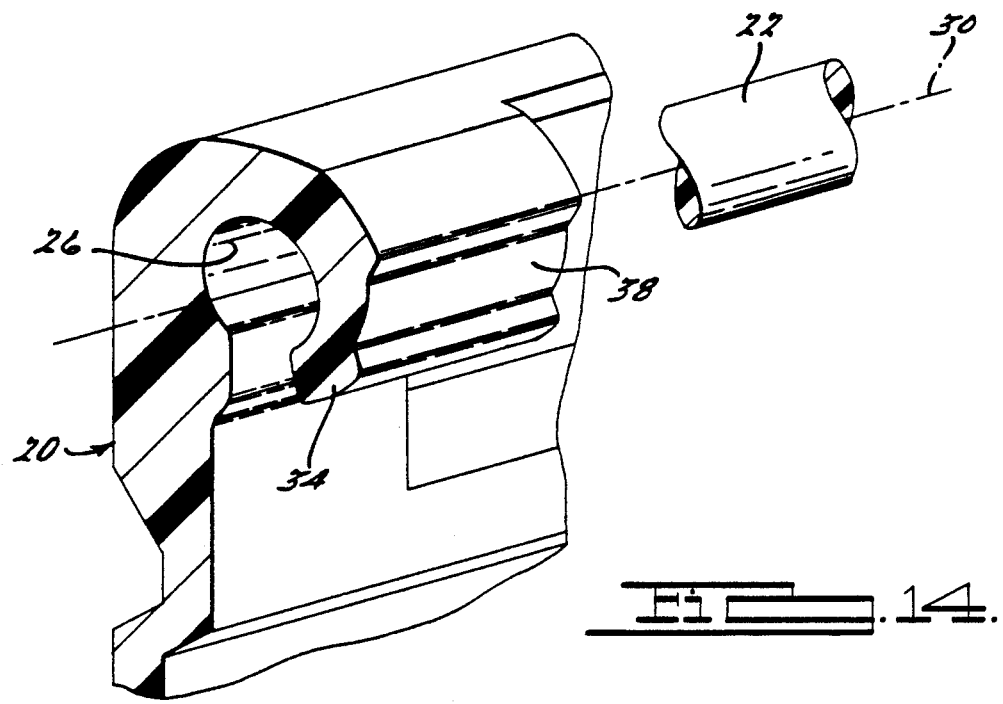
FIG. 14 is a partial perspective view of the pivot arrangement and one of the cam member arrangements of the exemplary vanity assembly of FIGS. 1 through 13.
Figure 15:
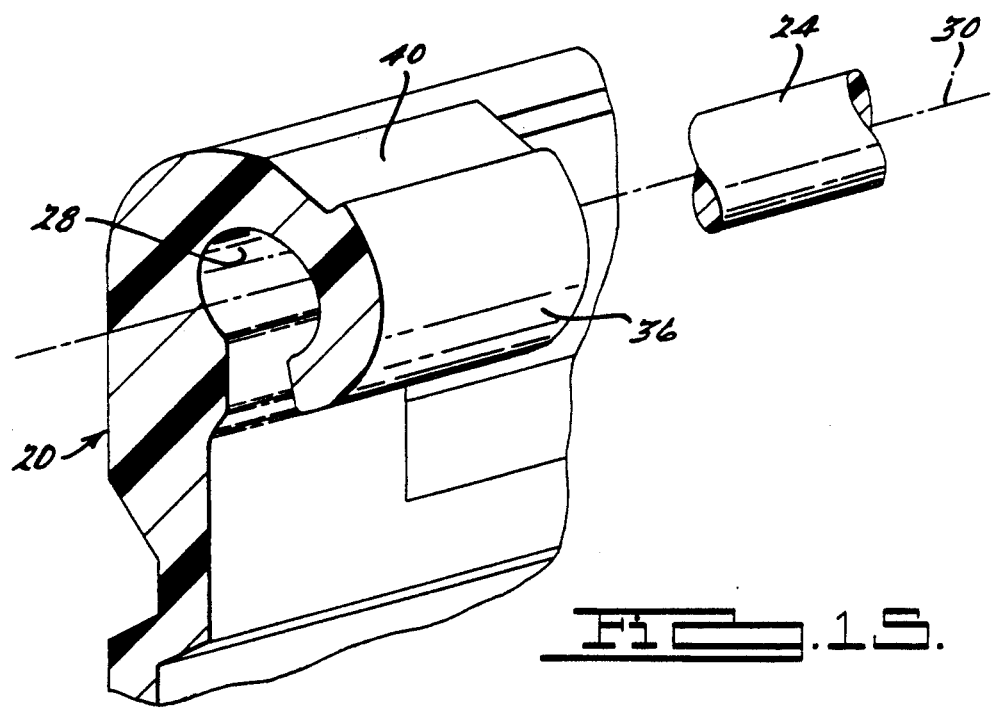
FIG. 15 is a partial perspective view similar to that of FIG. 14, but illustrating the other of the cam member arrangements.
Figure 14A:
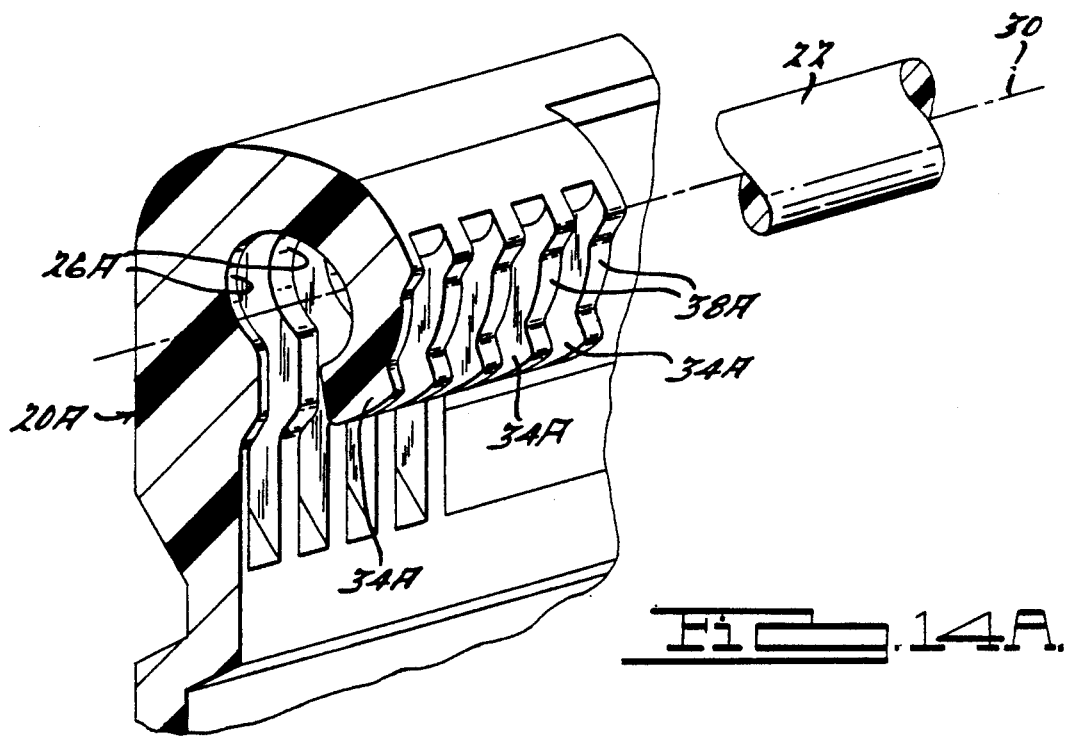
FIG. 14A is a partial perspective view, similar to that of FIG. 14, but illustrating an alternative cam member arrangement having multiple, parallel cam member segments.
Figure 15A:
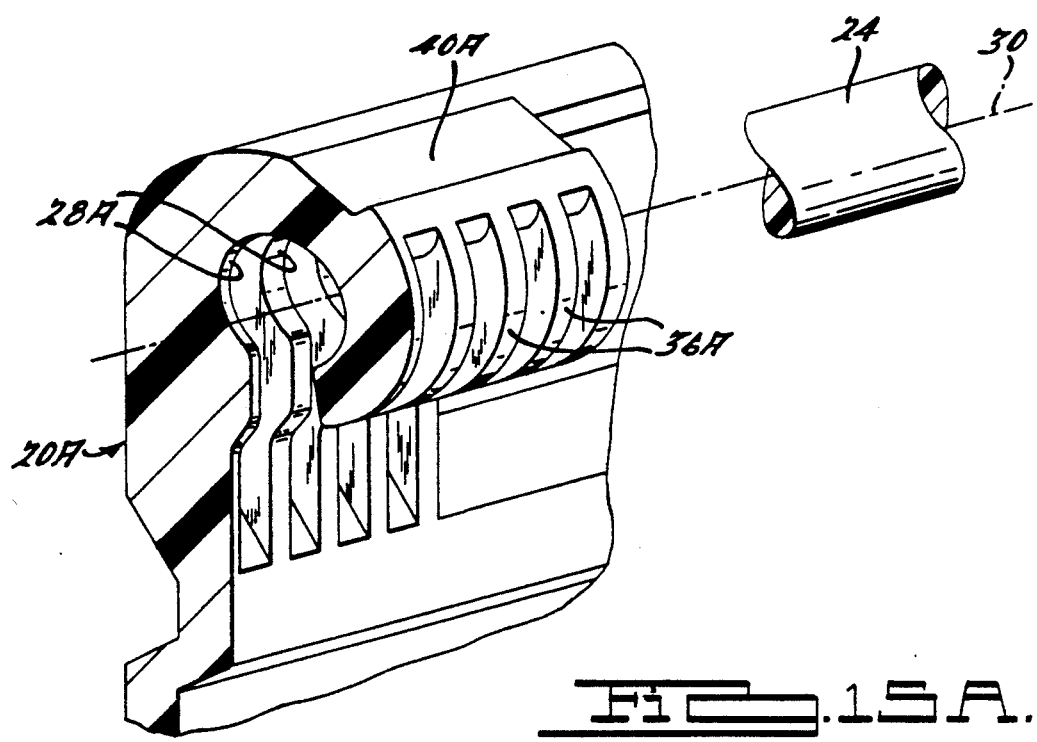
FIG. 15A is a partial perspective view, similar to that of FIG. 14A, but illustrating the other of the cam member arrangements in the alternative construction of FIG. 14A.
Figure 16:
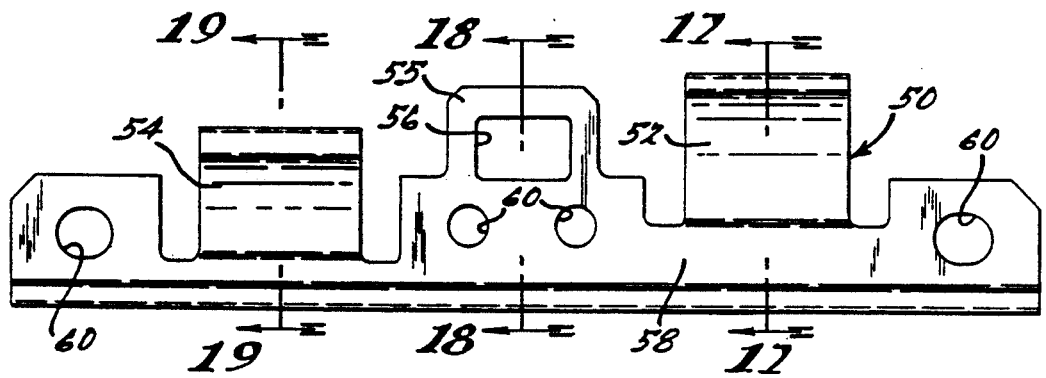
FIG. 16 is a front view of a preferred resilient spring member of the exemplary vanity assembly illustrated in FIGS. 1 through 15.
Figures 17, 18, 19:
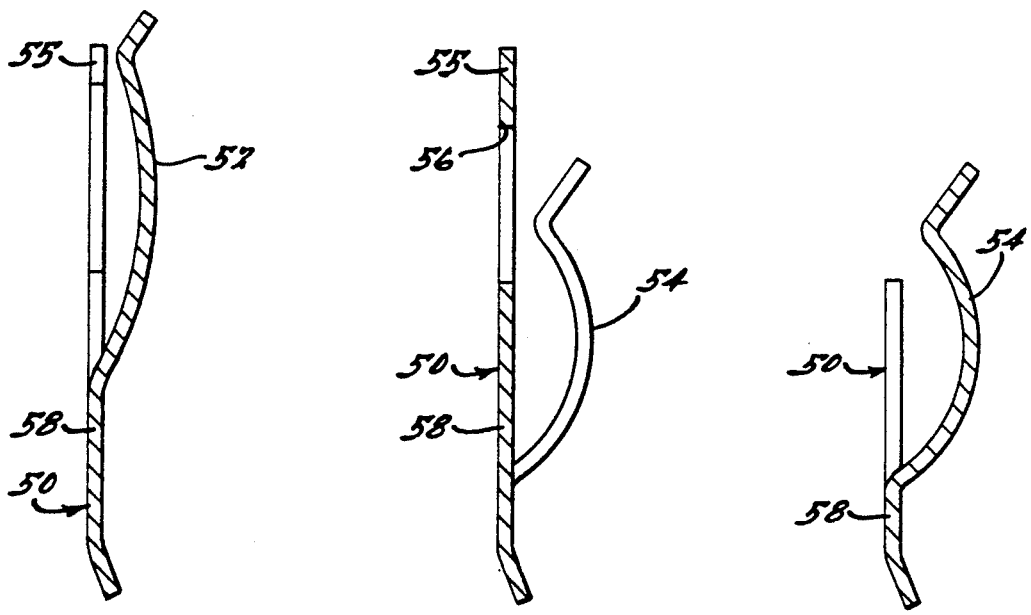
FIG. 17 is a cross-sectional view taken generally along line 17—17 of FIG. 16.
FIG. 18 is a cross-sectional view taken generally along line 18—18 of FIG. 16.
FIG. 19 is a cross-sectional view taken generally along line 19—19 of FIG. 16.
Figure 20:
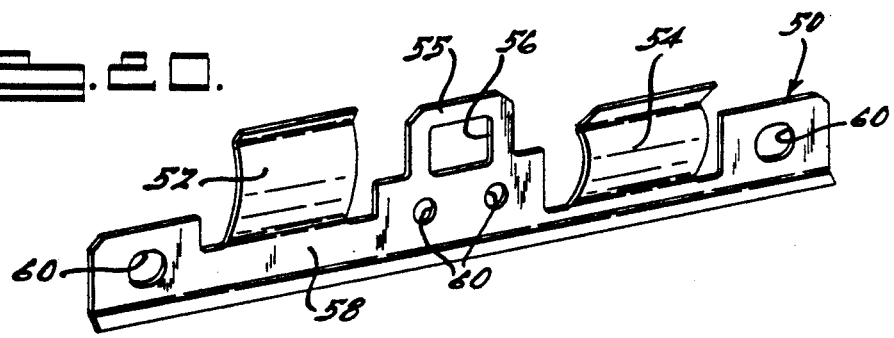
FIG. 20 is a perspective view of the preferred spring member illustrated in FIGS. 16 through 19.

In this regard, the cam members 34 and the cam members 36 can be formed as solid, "one-piece" cam members, as illustrated in FIGS. 14 and 15, or a parallel split or multiple cam member configuration can alternatively be used, as illustrated in FIGS. 14A and 15A. In this alternative arrangement, the multiple, parallel cam member segments 36A and 38A can be advantageous in certain applications to prevent material sagging or sinking in some injection molded constructions, for example. Similarly, although not expressly shown in the drawings, the protrusion 46 can also be optionally formed with such a multiple, parallel configuration.

The exemplary, illustrative hinge assembly 21 of the present invention has optionally been equipped with two different arrangements that substantially prevent inadvertent disconnection of the door 20 from the housing structure 18, with such arrangements being included either alone, or in conjunction with one another, as dictated by the design parameters in a particular application. During the initial opening movement of the door 20, when the susceptibility of disconnection is greatest, the protrusions 46 on the door 20 are received within the opening or receptacle 56 of the spring members 50, and functionally coupled with the above-discussed sliding and pivotal engagement of the pin members 76 with the hooked portions 72. This substantially prevents the possibility of inadvertent disconnection of the door 20 from the housing structure 18 during initial opening movement. During further opening movement, however, when the protrusion 46 is rotated to a position clear of the opening 56, and the potential for inadvertent disconnection of the door member 20 from the housing structure 18 is perhaps lessened, the engagement of the pin members 76 with the hooked portions 72 of the tab member 70 serves to substantially prevent such inadvertent disconnection during the remainder of the rotation. In a given application, one skilled in the art will readily recognize that one or the other of these interlocking relationships can be eliminated, or that in certain other applications both of such interlocking relationships may be desirable.

Finally, it should be noted, as will now be readily apparent to those skilled in the art, that the exemplary, illustrative arrangement depicted in the drawings, wherein the cam members and the protrusion 46 are interconnected or attached to the door 20, with the spring members being interconnected or attached to the housing structure, can optionally be reversed. In such reversed arrangement, the cam members or cam member arrangements and the protrusion 46 could be provided on the housing structure, with the spring members being provided on the door member.

The foregoing discussion discloses and describes exemplary embodiments of the present invention. One skilled in the art will readily recognize from such discussion, and from the accompanying drawings and claims, that various changes, modifications, and variations may be made therein without departing from the spirit and scope of the invention as defined in the following claims.

What is claimed is:

1. A spring-loaded hinge assembly for interconnecting a first member with a second member, said hinge assembly comprising: pivot means pivotally interconnecting said first and second members with one another for relative rotational movement about a generally longitudinally-extending axis; a first cam member protruding in a generally lateral direction from one of said first and second members, said first cam member having a first dwell portion thereon; first resilient biasing means on the other of said first and second members, said first resilient biasing means being resiliently deflectably engageable by said first cam member for exerting a first resilient biasing force on said first cam member, said first resilient biasing means tending to releasably maintain said first and second members in a first predetermined relative rotational orientation when engaged by said first dwell portion of said first cam member; a second cam member protruding in a generally lateral direction from said one of said first and second members, said second cam member having a second dwell portion thereon; and second resilient biasing means on said other of said first and second members, said second resilient biasing means being resiliently deflectably engageable by said second cam member for exerting a second resilient biasing force on said second cam member, said second resilient biasing means tending to releasably maintain said first and second members in a second predetermined relative rotational orientation when engaged by said second dwell portion of said second cam member, said first and second cam members and said first and second resilient biasing means being on the same hinge assembly with said first and second predetermined relative rotational orientations being distinct from one another.

2. An assembly according to claim 1, wherein said first member is an accessory door, and said second member is an accessory housing structure, said accessory door and said accessory housing structure being pivotally interconnected for said relative rotational movement between an opened door position and a closed door position.

3. An assembly according to claim 1, wherein said accessory housing structure includes means for housing a vehicle accessory and further includes means for attachment to a vehicle interior member.

4. An assembly according to claim 1, wherein said first cam member is separate and distinct from said second cam member, said first and second cam members being interconnected with said one of said first and second members for said relative rotational movement therewith.

5. An assembly according to claim 1, wherein said first resilient biasing means is separate and distinct from said second resilient biasing means, said first and second resilient biasing means being interconnected with said other of said first and second members for said relative rotational movement therewith.

6. An assembly according to claim 1, wherein said first and second resilient biasing forces are substantially equal to one another.

7. An assembly according to claim 1, wherein said first and second resilient biasing forces are different from one another.

8. An assembly according to claim 1, wherein said first predetermined relative rotational orientation is a generally open orientation wherein said first and second members are in a relative position pivoted generally away from one another.

9. An assembly according to claim 8, wherein said second predetermined relative rotational orientation is a generally closed orientation wherein said first and second members are in a relative position pivoted generally adjacent one another.

10. An assembly according to claim 1, wherein said first and second resilient biasing means are separate and distinct from one another and are both interconnected with a common resilient biasing means base portion, said base portion being secured to said other of said first and second members for said relative rotational movement therewith.

11. An assembly according to claim 10, wherein said base portion is resiliently deflectable and contributes to at least one of said first and second resilient biasing forces.

12. An assembly according to claim 1, wherein said first and second resilient biasing means include first and second resiliently deflectable leaf spring members, respectively.

13. An assembly according to claim 12, wherein said first and second leaf spring members are separate and distinct from one another and are both interconnected with a common base portion, said base portion being secured to said other of said first and second members for said relative rotational movement therewith.

14. An assembly according to claim 13, wherein said base portion is also resiliently deflectable and contributes to at least one of said first and second resilient biasing forces.

15. An assembly according to claim 1, further including a protrusion protruding generally laterally from said one of said first and second members in a direction generally toward said other of said first and second members, said other of said first and second members having a receptacle thereon for receiving said protrusion therein during at least a portion of said relative rotational movement of said first and second members, said protrusion substantially preventing said first and second members from being disconnected from one another when said protrusion is received in said receptacle.

16. An assembly according to claim 15, wherein said first and second resilient biasing means are separate and distinct from one another and are both interconnected with a common resilient biasing means base portion, said base portion being secured to said other of said first and second members for said relative rotational movement therewith, said receptacle including an opening formed in said base portion.

17. An assembly according to claim 16, wherein said base portion is resiliently deflectable and contributes to at least one of said first and second resilient biasing forces.

18. An assembly according to claim 15, wherein said first and second resilient biasing means include first and second resiliently deflectable leaf spring members, respectively, said first and second leaf spring members being separate and distinct from one another and are both interconnected with a common base portion, said base portion being secured to said other of said first and second members for said relative rotational movement therewith, said receptacle including an opening formed in said base portion.

19. An assembly according to claim 18, wherein said base portion is also resiliently deflectable and contributes to at least one of said first and second resilient biasing forces.

20. An assembly according to claim 1, wherein said assembly includes a number of said first cam members, each of said first cam members having said first dwell portion thereon for engaging said first resilient biasing means.

21. An assembly according to claim 1, wherein said assembly includes a number of said second cam members, each of said second cam members having said second dwell portion thereon for engaging said second resilient biasing means.

22. An assembly according to claim 21, wherein said assembly includes a number of said first cam members, each of said first cam members having said first dwell portion thereon for engaging said first resilient biasing means.

23. An assembly according to claim 1, wherein said one of said first and second members includes a tab member secured thereto for said relative rotational movement therewith, said tab member having a generally hooked portion protruding in a generally longitudinal direction therefrom, said other of said first and second members including a generally longitudinally-extending pin member secured thereto for said relative rotational movement therewith, said pin member engaging said hooked portion of said tab member for relative sliding engagement therewith during at least a portion of said relative rotational movement of said first and second members, said relative sliding engagement of said pin member and said hooked portion substantially preventing said first and second members from being disconnected from one another during at least said portion of said relative rotational movement.

24. An assembly according to claim 23, wherein said pin member and said hooked portion of said tab member each have a chamfered portion thereon in order to allow said pin member and said hooked portion to be snapped into said engagement with one another during assembly of said first and second members into said pivotal interconnection with one another.

25. An assembly according to claim 1, wherein said first member is a vanity door, and said second member is a vanity housing structure, said vanity door and said vanity housing structure being pivotally interconnected for said relative rotational movement between an opened door position and a closed door position.

26. An assembly according to claim 25, wherein said vanity housing structure includes means for being attached to a vehicle interior member.

27. An assembly according to claim 26, wherein said vehicle interior member is a sunvisor.

28. A spring-loaded hinge assembly for interconnecting a vehicle accessory door with a vehicle accessory housing structure, said accessory housing structure including means for attachment to a vehicle interior member, said hinge assembly comprising:
pivot means pivotally interconnecting said door and said housing structure with one another for relative rotational movement about a generally longitudinally-extending axis;
a first cam member protruding in a generally lateral direction from one of said door and said housing structure, said first cam member having a first dwell portion thereon;
first resilient biasing means on the other of said door and said housing structure, said first resilient biasing means being resiliently deflectably engageable by said first cam member for exerting a first resilient biasing force on said first cam member, said first resilient biasing means tending to releasably maintain said door and said housing structure in a first predetermined relative rotational orientation when engaged by said first dwell portion of said first cam member;
a second cam member protruding in a generally lateral direction from said one of said door and said housing structure, said second cam member having a second dwell portion thereon; and second resilient biasing means on said other of said door and said housing structure, said second resilient biasing means being resiliently deflectably engageable by said second cam member for exerting a second resilient biasing force on said second cam member, said second resilient biasing means tending to releasably maintain said door and said housing structure in a second predetermined relative rotational orientation when engaged by said second dwell portion of said second cam member,
said first cam member being separate and distinct from said second cam member, said first and second cam members being interconnected with said one of said door and said housing structure for said relative rotational movement therewith, said first and second resilient biasing means being separate and distinct from one another and are both interconnected with a common resilient biasing means base portion, said base portion being secured to said other of said door and said housing structure for said relative rotational movement therewith, said first and second cam members and said first and second resilient biasing means being on the same hinge assembly with said first and second predetermined relative rotational orientations being distinct from one another.

29. An assembly according to claim 28, wherein said first and second resilient biasing forces are substantially equal to one another.

30. An assembly according to claim 28, wherein said first and second resilient biasing forces are different from one another.

31. An assembly according to claim 28, wherein said base portion is resiliently deflectable and contributes to at least one of said first and second resilient biasing forces.

32. An assembly according to claim 28, wherein said first and second resilient biasing means include first and second resiliently deflectable leaf spring members, respectively.

33. An assembly according to claim 28, further including a protrusion protruding generally laterally from said one of said door and said housing structure in a direction generally toward said other of said door and said housing structure, said other of said door and said housing structure having a receptacle thereon for receiving said protrusion therein during at least a portion of said relative rotational movement of said door and said housing structure, said protrusion substantially preventing said door and said housing structure from being disconnected from one another when said protrusion is received in said receptacle.

34. An assembly according to claim 33, wherein said receptacle includes an opening formed in said base portion.

35. An assembly according to claim 34, wherein said base portion is resiliently deflectable and contributes to at least one of said first and second resilient biasing forces.

36. An assembly according to claim 28, wherein said assembly includes a number of said first cam members, each of said first cam members having said first dwell portion thereon for engaging said first resilient biasing means.

37. An assembly according to claim 28, wherein said assembly includes a number of said second cam members, each of said second cam members having said second dwell portion thereon for engaging said second resilient biasing means.

38. An assembly according to claim 37, wherein said assembly includes a number of said first cam members, each of said first cam members having said first dwell portion thereon for engaging said first resilient biasing means.

39. An assembly according to claim 28, wherein said one of said door and said housing structure includes a tab member secured thereto for said relative rotational movement therewith, said tab member having a generally hooked portion protruding in a generally longitudinal direction therefrom, said other of said door and said housing structure including a generally longitudinally-extending pin member secured thereto for said relative rotational movement therewith, said pin member engaging said hooked portion of said tab member for sliding engagement therewith during at least a portion of said relative rotational movement of said first and second members, said relative sliding engagement of said pin member and said hooked portion substantially preventing said door and said housing structure from being disconnected from one another during at least said portion of said relative rotational movement.

40. An assembly according to claim 39, wherein said pin member and said hooked portion of said tab member each have a chamfered portion thereon in order to allow said pin member and said hooked portion to be snapped into said engagement with one another during assembly of said door and said housing structure into said pivotal interconnection with one another.

41. An assembly according to claim 28, wherein said accessory door is a vanity door, and said accessory housing structure is a vanity housing structure, said vanity door and said vanity housing structure being pivotally interconnected for said relative rotational movement between an opened door position and a closed door position.

42. An assembly according to claim 41, wherein said vehicle interior member is a sunvisor.

* * * * *

UNITED STATES PATENT AND TRADEMARK OFFICE
CERTIFICATE OF CORRECTION

PATENT NO. : 4,993,772

DATED : February 19, 1991

INVENTOR(S) : Grace M. Charen

It is certified that error appears in the above-identified patent and that said Letters Patent is hereby corrected as shown below:

Column 12, line 4, claim 28, begin new paragraph with "second resilient ....."

Signed and Sealed this

First Day of December, 1992

*Attest:*

DOUGLAS B. COMER

*Attesting Officer*      *Acting Commissioner of Patents and Trademarks*